United States Patent [19]

Vanderpool et al.

[11] Patent Number: 4,808,384

[45] Date of Patent: * Feb. 28, 1989

[54] RECOVERY OF TUNGSTEN, SCANDIUM, IRON, AND MANGANESE FROM TUNGSTEN BEARING MATERIAL

[75] Inventors: Clarence D. Vanderpool, Towanda; Judith A. Ladd, Sayre; Martin B. MacInnis, Towanda; Mary A. Fedorchak, Rome, all of Pa.

[73] Assignee: GTE Products Corporation, Stamford, Conn.

[*] Notice: The portion of the term of this patent subsequent to Nov. 25, 2003 has been disclaimed.

[21] Appl. No.: 145,634

[22] Filed: Dec. 21, 1987

Related U.S. Application Data

[63] Continuation of Ser. No. 877,566, Jun. 23, 1986, abandoned.

[51] Int. Cl.$^4$ ............................................. C01G 41/00
[52] U.S. Cl. ....................... 423/21.1; 423/21.5; 423/49; 423/53; 423/54; 423/139; 423/150; 75/2; 75/101 R; 75/101 BE; 75/121
[58] Field of Search ............... 423/54, 57, DIG. 4, 423/53, 21.1, 21.5, 146, 139, 150; 75/101 R, 101 BE, 121, 2

[56] References Cited

U.S. PATENT DOCUMENTS

| | | | |
|---|---|---|---|
| 4,028,463 | 6/1977 | Stauter | 423/57 |
| 4,624,703 | 11/1986 | Vanderpool et al. | 423/54 |
| 4,626,280 | 12/1986 | Vanderpool et al. | 423/53 |

FOREIGN PATENT DOCUMENTS 374250  2/1932  United Kingdom .................. 423/57

Primary Examiner—Robert L. Stoll
Attorney, Agent, or Firm—Donald R. Castle; L. Rita Quatrini

[57] ABSTRACT

A process is disclosed for recovering tungsten, iron, and manganese from tungsten bearing material. The process involves digesting the material in a sufficient amount of sulfuric acid at a temperature of at least about 80° C. for a sufficient time in the presence of coal as a reducing agent to form a digestion solution containing the major portion of the scandium, iron, and manganese and a digestion residue containing the major portion of the tungsten, followed by separating the solution from the residue. The major portion of the scandium can be extracted from the digestion solution with an organic solution consisting essentially of a mixture of tertiary alkyl primary amines which are present in an amount sufficient to extract the major portion of the scandium, and the balance an essentially aromatic solvent. The scandium is stripped from the organic with hydrochloric acid which is then separated from the stripped organic. The extraction can be accomplished by an organic solution consisting essentially of an extracting agent which is a dialkyl phosphoric acid and an essentially aromatic solvent. In this latter case, the stripping agent for the scandium is an aqueous solution of ammonium carbonate.

20 Claims, No Drawings

RECOVERY OF TUNGSTEN, SCANDIUM, IRON, AND MANGANESE FROM TUNGSTEN BEARING MATERIAL

This application is a continuation of application Ser. No. 877,566, filed 6-23-86, and now abandoned.

BACKGROUND OF THE INVENTION

This invention relates to a process for recovering tungsten, scandium, iron, and manganese from tungsten bearing material.

In the processing of tungsten ores as scheelites, wolframites, etc. to recover tungsten, residues are generated which contain in addition to tungsten, valuable metals as scandium, iron, and manganese. The residues can also contain a number of other elements as calcium, niobium, arsenic, antimony, etc.

It would be desirable to recover these metals for reuse, and it would be highly desirable from an economic standpoint to recover these metals without using fusion or expensive reagents.

SUMMARY OF THE INVENTION

In accordance with one aspect of this invention there is provided a process for recovering tungsten, iron, and manganese from tungsten bearing material. The process involves digesting the material in sufficient sulfuric acid at a temperature of at least about 80° C. for a sufficient time in the presence of coal as a reducing agent to form a digestion solution containing the major portion of the scandium, iron, and manganese, and a digestion solid containing the major portion of the tungsten which is separated from the digestion solution.

In accordance with another aspect, the major portion of the scandium is extracted from the digestion solution with an organic consisting essentially of an extracting agent which is essentially a mixture of alkyl primary amines which are present in an amount sufficient to extract the major portion of the scandium, and the balance an essentially aromatic solvent. After separation of the scandium containing organic from the raffinate, the organic is stripped of the scandium with hydrochloric acid which is then separated from the stripped organic.

In accordance with still another aspect, the major portion of the scandium is extracted from the digestion solution with an organic solution consisting essentially of an extracting agent which is a dialkyl phosphoric acid which is present in an amount sufficient to extract the major portion of the scandium without extracting appreciable amounts of iron and manganese, and the balance an essentially aromatic solvent. After separation of the scandium-containing organic from the raffinate, the organic is stripped of the scandium with an aqueous solution of ammonium carbonate which is separated from the resulting stripped organic.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The tungsten bearing material of this invention can be essentially any such material. The preferred material, however, is the residue that results from the processing of tungsten ores as scheelites, wolframites, etc. The ores are typically digested in sodium hydroxide to solubilize the tungsten as sodium tungstate. The residue from this process is the preferred starting material of this invention.

The tungsten bearing material typically contains in percent by weight from about 21.0% to about 24% Fe, about 18.0% to about 23% Mn, about 0.06% Sc, and from about 1.0% to about 2% W.

The tungsten bearing material is first digested in sufficient sulfuric acid at a temperature of at least about 80° C. for a sufficient time in the presence of a coal as a reducing agent to form a digestion solution containing the major portion of the scandium, iron and manganese and a digestion residue containing the major portion of the tungsten.

Sulfuric acid does not produce a toxic material such as chlorine gas which is produced when hydrochloric acid is used as the digesting acid. Also, sulfuric acid is the least expensive acid. For these reasons, it is chosen as the digesting acid.

In order to accomplish the essentially complete digestion of the material and solubilization of the scandium, manganese and iron, the manganese must be reduced. This requires an effective reducing agent. Coal is an effective reducing agent and is economical to use. The amount of coal that is used is preferably an amount which results in a weight ratio of coal to manganese of about 2 to 9.

It is preferred that the tungsten bearing material be added slowly to the sulfuric acid because the material usually forms carbonates during storage.

Digestion temperatures are preferably in the range of from about 80° C. to about 150° C. with from about 100° C. to about 140° C. being especially preferred. These temperatures are required in order for the coal to function as a reducing agent. The production of foam during the digestion is generally an indication that the coal is reacting.

The digestion time depends on the temperature, the size of the charge and the nature of the equipment. The preferred digestion times are in the range of from about 4 hours to about 7 hours with from about 5 hours to about 7 hours being preferred.

It is preferred that the sulfuric acid concentration be from about 18 normal to about 36 normal. Amounts of sulfuric acid will become apparent in the example.

The digestion solution is then separated from the digestion residue by any standard method such as by filtration.

As a result of the digestion, the major portion and most typically essentially all of the scandium, iron, and manganese are solubilized in the digestion solution. A typical analysis of the digestion solution is from about 23 to about 24 g Fe/l, about 16 g Mn/l, from about 0.15 to about 0.23 g W/l, and about 0.04 g Sc/l.

Typically all but about 2.5% by weight of the starting iron, about 0.65% by weight of the starting manganese, and less than about 0.03% by weight of the starting scandium report with the digestion residue. The major portion, typically about 84% by weight of the tungsten reports with the digestion residue typically as tungstic acid. The tungsten can be recovered from this residue by well known standard methods.

In accordance with one aspect of this invention, the major portion of the scandium is then extracted from the digestion solution with an organic solution consisting essentially of an extracting agent which is essentially a mixture of alkyl primary amines which are present in an amount sufficient to extract the major portion of the scandium without extracting appreciable amounts of iron and manganese, and the balance an essentially aromatic solvent.

The preferred alkyl primary amines are tertiary alkyl primary amines wherein the alkyl groups have from about 18 to about 22 carbon atoms. For example, the preferred formulas range from $C_{18}H_{37}NH_2$ to $C_{22}H_{45}NH_2$. A preferred source of such a mixture of primary amines having the above formula ranges is supplied by Rohm and Haas Co. under the trade name of Primene JM-T. The extracting agent is selective for scandium over iron and manganese. The concentration of the extracting agent is therefore critical because at concentrations above the amount needed to extract the scandium, iron and manganese are extracted along with the scandium resulting in a less efficient separation of scandium from the iron and manganese. However, in accordance with the preferred embodiment of this invention, for the typical digestion solution relative concentrations of scandium, iron, and manganese, which will be apparent in the example, the preferred concentration of extracting agent is from about 10% to about 25% by volume of the organic solution.

The preferred essentially aromatic solvent consists essentially of a mixture of alkyl benzenes wherein the alkyl benzenes have molecular weights of 120, 134, or 148 and the total number of carbon atoms attached to the benzene ring is either 3, 4, or 5. Typical constituents include trimethyl benzene, ethyl benzene, dimethylethyl benzene, methyl propyl benzene, tetramethyl benzene, diethyl toluene, dimethylisopropyl benzene, and the like. The material is sold by Buffalo Solvents and Chemicals Corporation under the trade name of SC#150. In the 1972 edition of "Organic Solvents," a trade publication of Buffalo Solvents and Chemicals Corporation, SC#150 is listed as having a boiling point of from about 188° C. to about 210° C., a flash point of 151° F., and a specific gravity of about 0.891.

The resulting scandium containing organic is separated from the resulting raffinate which is essentially scandium free. A typical analysis of the raffinate is less than about 0.03 g Sc/l. The raffinate contains the major portion of the iron and manganese which were originally present in the digestion solution.

The preferred method of carrying out the extraction step is by contacting a fresh aliquot of organic with the digestion solution followed by separating the resulting scandium-containing organic aliquot from the aqueous phase. The resulting aqueous phase can then be contacted with another fresh aliquot of organic and then separated from the organic. Separation is accomplished by allowing the organic and aqueous (raffinate) phases to physically disengage. The aqueous phase is then preferably drawn off from the organic phase through the bottom of an extraction cell. This process can be repeated any number of times, with the usual time being about 3, until essentially all of the scandium is removed from the digestion solution and is present in the organic aliquots. The organic aliquots can then be combined to form one scandium containing organic.

The scandium—containing organic is then stripped of essentially all of the scandium by contacting the organic with a hydrochloric acid solution preferably of from about 1 normal to about 4 normal to form a scandium—containing hydrochloric acid solution.

The scandium—containing hydrochloric acid solution is then separated from the resulting stripped organic by essentially the same phase disengagement technique described previously. The scandium can be recovered from this solution by conventional techniques. For example, the solution can be evaporated to dryness to produce a scandium concentrate which can be further-processed by standard methods.

The scandium—free raffinate contains iron and manganese which can be recovered by known methods.

In accordance with another aspect of this invention, the the major portion of the scandium is extracted from the digestion solution with an organic solution consisting essentially of an extracting agent which is a dialkyl phosphoric acid which is present in an amount sufficient to extract the major portion of the scandium without extracting appreciable amounts of iron and manganese, and the balance an essentially aromatic solvent. The formula of the dialkyl phosphoric acid is:

$$(RO)_2P(O)OH \rightleftharpoons (RO)_2P(O)O^- H^+.$$ 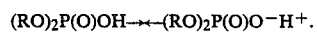

The preferred dialkyl phosphoric acid is di(2-ethylhexyl phosphoric acid, D2EHPA, which is typically supplied by Mobil Corporation. In this case one of the alkyl groups, (R) is 2-ethyl hexyl. Basically the mechanism of extraction involves an exchange of the available hydrogen of the dialkyl phosphoric acid for the scandium which is in the cationic form. The extracting agent is selective for scandium over iron and manganese. The concentration of the dialkyl phosphoric acid is critical because at concentrations above the amount needed to extract the scandium, iron and manganese are extracted along with the scandium resulting in a less efficient separation of scandium from the iron and manganese. Furthermore, presence of excess amounts of iron and manganese in the organic can cause emulsions which make the extraction step inoperable.

The amount of dialkyl phosphoric acid in the organic is therefore governed by the amount of scandium in the digestion solution. The amount of dialkyl phosphoric acid which is to be needed can be detrimental experimentally by well known methods in solvent extraction technology. In accordance with a preferred embodiment of this invention, the typical amount of D2EHPA is from about 2% to about 10% by volume to extract the scandium from typical digestion solutions, with about 2% by volume being the especially preferred concentration.

The preferred essentially aromatic solvent is the same as has been described previously.

The scandium is then stripped from the scandium containing organic with an aqueous solution of ammonium carbonate to form a scandium-containing ammonium carbonate solution. The ammonium carbonate stripping solution contains preferably from about 5% to about 10% by weight of ammonium carbonate.

The scandium-containing ammonium carbonate solution is then separated from the resulting stripped organic solution. This can be done by essentially the same technique as in the extraction steps.

The extraction and stripping steps can be carried out by any standard liquid-liquid extraction technique such as by those described previously.

The scandium-containing ammonium carbonate solution can now be processed by standard methods to recover the scandium. For example, the solution can be evaporated to dryness followed by heating the resulting solid to about 400° C. to drive off the ammonium carbonate. The resulting residue can then be processed by standard methods to render the scandium in usable form.

The raffinate from the extraction contains iron and manganese which can be recovered by standard methods.

The above described process affords an economic method of recovering tungsten, scandium, iron, and manganese without use of fusion or expensive reagents.

To more fully illustrate this invention, the following nonlimiting example is presented.

EXAMPLE

About 100g of dry tungsten bearing material containing in percent by weight about 23.7% Fe, about 22.5% Mn, about 0.06% Sc, and about 2% W is added slowly to about 300 cc of a 18 N $H_2SO_4$ solution. Slow addition is desirable because of foaming. After all the material is added to the acid, the resulting slurry is digested with heat for about 2 hours. The volume is kept relatively constant with addition of water as needed. After about 2 hours, powdered coal is added slowly. Again the addition is made relatively slowly to prevent foaming. After all the coal has been added, the slurry is digested for a total of about 6 hours. The temperature is from about 100° C. to about 140° C. After the digestion period, the color of the resulting digestion residue is a gray to white indicating a good digestion, that is very little, Fe, Mn, and Sc remain in the digestion residue. After dilution to about 600 cc, the resulting slurry is filtered to separate the resulting digestion solution from the digestion residue. The residue is dried and analyzed. It is found to contain about 2.5% by weight of the starting iron, about 0.65% by weight of the starting manganese, about 84% by weight of the starting tungsten, and less than about 0.00003% by weight of the starting scandium. The resulting digestion solution which contains essentially all of the iron, manganese, and scandium is then contacted in about a 1:1 volume ratio without about 10% by volume primary JM-T inn Sc#150. Contact time is about 5 minutes. After separation of the organic and aqueous, the resulting scandium containing organic is stripped in about a 1:1 volume ratio with about a 2N HCl solution. After separation of the resulting stripped organic and the resulting scandium containing hydrochloric acid strip solution, the strip solution is evaporated to dryness and fired at about 450° C. for about 4 hours to remove any organics or carbon. The resulting solid contains about 95.45% by weight of the starting scandium and some iron and manganese. The stripped organic contains less than about 0.4 mg Sc/l. The raffinate from the scandium extraction contains iron and manganese and less than about 0.4 mg Sc/l. This raffinate is treated with ammonium hydroxide to a pH of from about 6 to about 7 and typically about 6.8 to precipitate the iron. This precipitate of iron is filtered off and washed by reslurrying in hot water with agitation for about 1 hour, then refiltered. The wash water is added to the mother liquor resulting from the precipitation of the iron. About 80% to about 95% by weight of the starting iron is recovered in this precipitate. The combined liquor from the iron precipitation and the wash solution are treated with hydrogen sulfide at room temperature for about 20 to 30 minutes to precipitate sulfides of any As, Sb, Cu, Sn, W, etc which may be present. These sulfides are filtered off. Ammonium carbonate is added to the resulting liquor to precipitate manganese as manganese carbonate.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for separating tungsten, from scandium, iron, and manganese in tungsten bearing material, said process comprising:
    (a) digesting said material in sufficient sulfuric acid at a temperature of at least about 80° C. for a sufficient time in the presence of coal as a reducing agent to form a digestion solution containing the major portion of the scandium, iron and manganese and a digestion residue containing the major portion of the tungsten; and
    (b) separating said digestion solution from said digestion residue.

2. A process of claim 1 wherein the concentration of said sulfuric acid is from about 18 normal to about 36 normal.

3. A process of claim 1 wherein said coal is present in a weight ratio of coal to manganese of about 2 to 9.

4. A process of claim 1 wherein the digestion step is carried out at a temperature of from about 80° C. to about 150° C. for from about 4 hours to 7 hours.

5. A process of claim 4 wherein said digestion step is carried out at a temperature of from about 100° C. to about 140° C. for from about 5 hours to about 7 hours.

6. A process for recovering tungsten, scandium, iron, and manganese from tungsten bearing material, said process comprising:
    (a) digesting said material in sufficient sulfuric acid at a temperature of at least about 80° C. for a sufficient time in the presence of coal as a reducing agent to form a digestion solution containing the major portion of the scandium, iron and manganese and a digestion residue containing the major portion of the tungsten;
    (b) separating said digestion solution from said digestion residue;
    (c) extracting the major portion of the scandium from said digestion solution with an organic solution consisting essentially of an extracting agent which is essentially a mixture of tertiary alkyl primary amines which are present in an amount sufficient to extract the major portion of the scandium, and the balance an essentially aromatic solvent;
    (d) separating the resulting scandium containing organic from the resulting raffinate;
    (e) stripping essentially all of the scandium from the scandium-containing organic solution by contacting said scandium-containing organic solution with hydrochloric acid to form a scandium containing hydrochloric acid solution; and
    (f) separating said scandium containing hydrochloric acid solution from the resulting stripped organic solution.

7. A process of claim 6 wherein the sulfuric acid concentration is from about 18 normal to about 36 normal.

8. A process of claim 6 wherein said coal is present in a weight ratio of coal to manganese of about 2 to 9.

9. A process of claim 6 wherein the digestion step is carried out at a temperature of from about 80° C. to about 150° C. for from about 4 hours to 7 hours.

10. A process of claim 9 wherein said digestion step is carried out at a temperature of from about 100° C. to about 140° C. for from about 5 hours to about 7 hours.

11. A process of claim 6 wherein said extracting agent is essentially a mixture of tertiary alkyl primary amines wherein the alkyl groups have from about 18 to about 22 carbon atoms.

12. A process of claim 11 wherein said essentially aromatic solvent consists essentially of a mixture of alkyl benzenes wherein the alkyl benzenes have molecular weights of 120, 134, or 148, and the total number of carbon atoms attached to the benzene ring are either 3, 4, or 5.

13. A process of claim 6 wherein the hydrochloric acid concentration is from about 1 normal to about 4 normal.

14. In the process for recovering tungsten, scandium, iron and manganese from tungsten bearing materials wherein said process comprises digesting the material in sulfuric acid to form a digestion solution containing major portions scandium, iron and manganese and a digestion residue containing the major portion of the tungsten wherein the said digestion solution is separated from the digestion residue and a major portion of scandium is extracted from the digestion solution with an organic extracting agent in the presence of a aromatic solvent and the scandium is stripped from the scandium containing organic with a suitable stripping agent and thereafter separated from the strip organic, the improvement comprising utilizing coal as a reducing agent in the digestion step.

15. A process of claim 14 wherein the sulfuric acid concentration is from about 18 normal to about 36 normal.

16. A process of claim 14 wherein said coal is present in a weight ratio of coal to manganese of about 2 to 9.

17. A process of claim 14 wherein the digestion step is carried out at a temperature of from about 80° C. to about 150° C. for from about 4 hours to 7 hours.

18. A process of claim 17 wherein said digestion step is carried out at a temperature of from about 100° C. to about 140° C. for from about 5 hours to about 7 hours.

19. A process of claim 14 wherein the extracting agent is di(2-ethylhexyl) phosphoric acid.

20. A process of claim 19 wherein said essentially aromatic solvent consists essentially of a mixture of alkyl benzenes wherein the alkyl benzenes have molecular weights of 120, 134, or 148, and the total number of carbon atoms attached to the benzene ring are either 3, 4, or 5.

* * * * *